Oct. 14, 1941.   C. H. FORBELL   2,258,603
EDUCATIONAL AND AMUSEMENT DEVICE
Filed Jan. 24, 1939
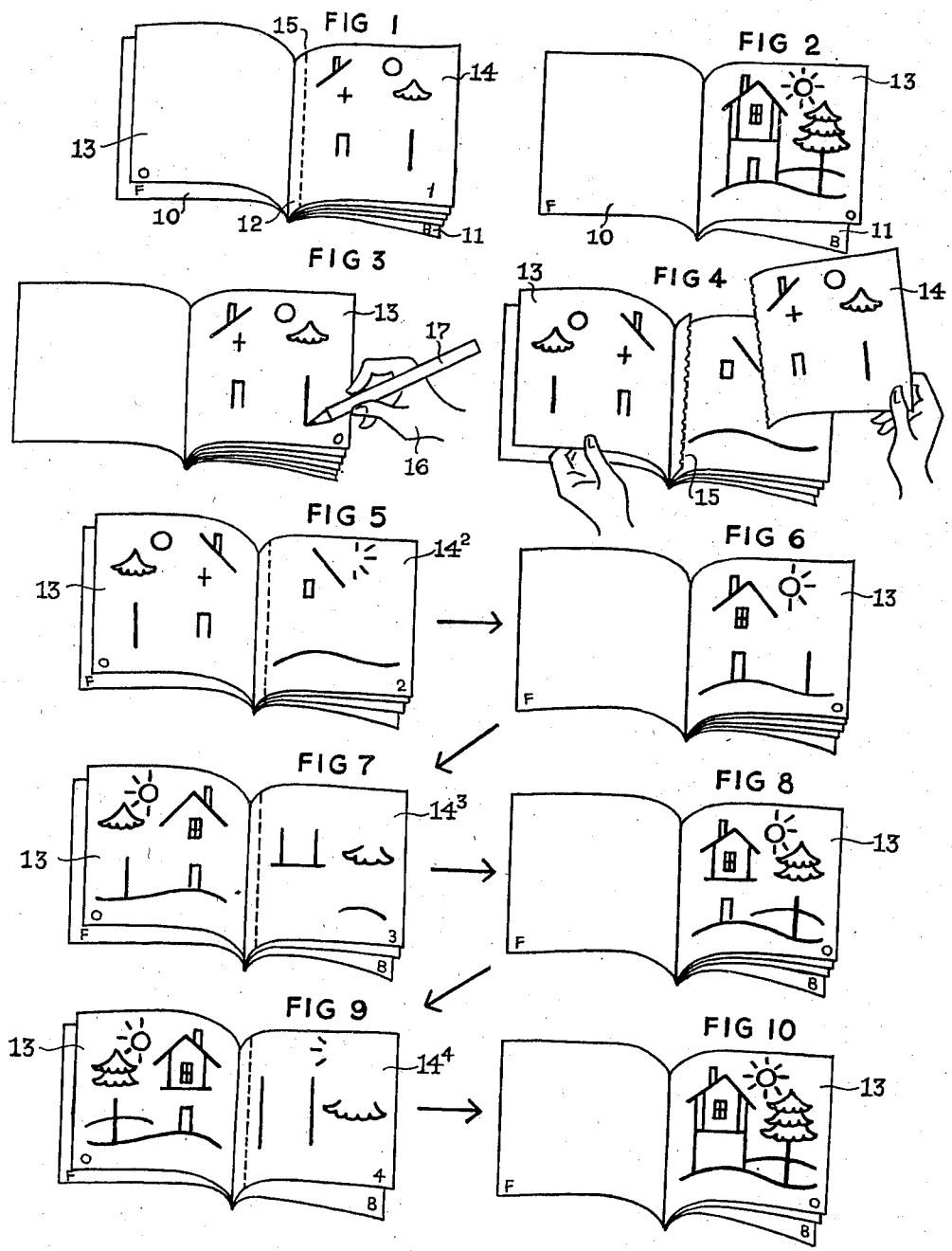
INVENTOR
CHARLES H FORBELL
BY
HIS ATTORNEY Patented Oct. 14, 1941

2,258,603

UNITED STATES PATENT OFFICE 2,258,603

EDUCATIONAL AND AMUSEMENT DEVICE

Charles H. Forbell, Bayside, N. Y.

Application January 24, 1939, Serial No. 252,567

1 Claim. (Cl. 35—26)

The present invention relates to an educational and amusement device and it particularly relates to a booklet or similar arrangement useful for amusement purposes or by which children or adults may be instructed in the art of drawing and/or games may be played by either adults or children.

In most drawing exercises as presented to children it is not readily possible for the child to disassemble the figure or design to be drawn and start out with the basic lines and later add additional or further lines, which, with increasing complication, eventually complete the figure or design to be reproduced.

The presentation of most figures, to be sketched or drawn, to children usually results in the confusion in the child's mind and it is not until after the child becomes quite mature or even adolescent that it realizes that the designs or figures actually consist of a system of lines and small details, which may be separately studied and applied to a sheet of paper or to the sketch pad and subsequently assembled into the completed figure.

After considerable experimentation and research, it has been found that instruction in drawing may be most readily given to children and to other people who may desire to much better grasp the principles thereof by impressing upon them in the course of instruction the fact that all figures are composed of a series of lines or details which may be separately studied and drawn and which, when assembled into the completed figure, will give the final design, grouping or picture of animate and/or inanimate objects.

In this construction it has been found desirable, not to give the person a view of parts of an entire final design or scheme to be reproduced, since this detracts from the instruction in that the person is constantly on the search for or desirous of finding part or whole of the final design.

The instruction is much more effective when the final design is concealed or not known to the person being instructed and the attention of such persons is concentrated on placing a series of more or less unrelated figures upon a sheet which gradually appear to shape up into the final object, since it is in this manner that it has been found that the best instruction may be imparted to those unacquainted with or ignorant of, the basic principles of sketching and drawing.

It is therefore among the objects of the present invention to provide an improved or educational instruction booklet, which may be readily employed not only in the instruction of children but also for the amusement and/or education of adults or persons more matured.

Still further objects and advantages will appear in the more detailed description set forth below, it being understood however that this more detailed description is given by way of illustration and explanation only, and not by way of limitation, since various changes therein may be made by those skilled in the art without departing from the scope and spirit of the present invention.

In one preferred form of the present invention, a booklet is made up having a front and back cover and a plurality of intermediate sheets, each carrying portions or fragments of the design according to a predetermined arrangement, such fragments or portions being spread more or less over the entire page or intermediate sheet.

A single tracing sheet may be provided at the beginning of the booklet, and the tracing sheet may be used to trace the sheets successively with the removal of each sheet after the fragments of the design thereon have been traced.

The final album or portfolio, after the pages containing the fragmentary designs have been removed, may then be preserved by the party who made the tracings or who was undergoing the course of instruction.

As an alternative construction the booklet may also be provided with a series of pages which have the designs positioned thereon at successively greater distances from the margin of the page or from the binding, with the story opposite each figure describing its position or setting forth its relationship to the completed picture. One figure after another in this way may be uncovered until a final assemblage is obtained.

On the other hand, it is also possible, according to one presentation of the present invention, to tear off other portions of each of the sheets after the story has been read, with the result that the remaining portions of the subsequent sheets, which are uncovered by the preceding sheets, will successively present more and more of the complete grouping or story until the final tear off has been made.

Referring to the drawing which illustrates several of the various possible embodiments of the present invention, but to which the present invention is by no means restricted, since the drawing is merely by way of illustration and not by way of limitation.

Fig. 1 is a diagrammatic perspective view illustrating the booklet with the tracing sheet opened to the left side and with the first page of fragmentary designs opened to the right, Fig. 2 is a diagrammatic perspective view similar to Fig. 1 with all of the sketched pages removed and with the final tracing in position so that the booklet may be used as a portfolio, Figs. 3 to 10 illustrate successive steps in the operation of obtaining the final portfolio of Fig. 2 from the initial booklet of Fig. 1.

Referring specifically to Figs. 1 and 2, the book is provided with a cover 10, a back 11, a binding 12, a tracing sheet 13 and a plurality of fragmentary design sheets 14.

The back of the front page is indicated in the lower outside corner by F, the lower outside corner of the tracing sheet is indicated by O and the lower outside corners of the successive fragmentary design sheets are indicated by page numbers 1 to 4.

The lower outside corner of the backing sheet is indicated by B. These indications on the lower outside corners of the pages enable one to follow more readily the successive operations indicated in Figs. 3 to 10.

The various sheets 12, enumerated 1 to 4, may be successively detached along the tear lines 15, as indicated.

In the final portfolio, as indicated in Fig. 2, the tracing sheet 13, which is in position on the reverse side from its position, as shown in Fig. 1, has the completed design traced upon it and the combination of the front page 10, the completed tracing page 13 and the back page 11 may be used as a portfolio and put away for preservation.

Referring to the successive steps in Fig. 3, the tracing sheet 13 is placed over on the first fragmentary design sheet 14 and the figures are traced, as indicated by the hand 16 and the pencil or other writing instrument 17. Then, as shown in Fig. 4, when the tracing has been completed, the first fragmentary design sheet 1 is removed along the tear line 15.

In Fig. 5, the booklet is shown after the removal of the first fragmentary design sheet 14' and before the tracing sheet 13 is placed over the second fragmentary design sheet 14². This tracing sheet is placed upon the second fragmentary design sheet in Fig. 6, and the tracing operation, as indicated in Fig. 3, is repeated to obtain the more advanced drawing, as indicated upon sheet 13 in Figs. 6 and 7.

As indicated in Fig 7, the second fragmentary design sheet 14² has been removed, exposing the third fragmentary design sheet 14³ which then is covered by the tracing sheet in Fig. 8.

Then additional matter is traced upon the tracing sheet 13 in the manner indicated in Fig. 3. The tracing sheet 13, as shown in Figs. 8 and 9, will then be complete except for the addition of the fragmentary figures on the fourth and last fragmentary design sheet 14⁴, which is uncovered by removal of the sheet 14³ by the operation of Figs. 8 and 9.

After the final tracing has been made, as indicated in Fig. 10, the sheet 14⁴ may be removed to produce the final portfolio of Fig. 2.

Although not shown, if desired, a final sheet with the completed design could be provided and it is obvious that very complicated designs could be presented for instruction or amusement purposes and the number of fragmentary design pages may be increased to any number up to 20 to 100 or more.

In this regard children and others may be educated as well as amused by concentrating on fragments of a design, which finally assemble themselves without need for definite assembly by the drawer into a final finished drawing.

This mode of instruction is particularly valuable in that the child is taught to select successive portions or elements of a design without becoming confused by the entire design being presented at one time.

It is apparent that the applicant has devised an educational device of great value, which is useful for either children or adults and which may be widely applied.

It will be noted that the device or booklet is so styled to control the sequence of operation, with the result that the operator or drawer is only concerned with the immediate element with which he is tracing or with which he is dealing. All other material which must be used in the process arriving at the final result is kept out of sight and by a gradual or partial destruction of the original device, the operator finally achieves the final complete result.

The successive elimination of the constructional material, after it has accomplished its purpose, is particularly valuable from an educational point of view and it aids in arousing curiosity and interest which can only be satisfied when the operation has been completed and when the final design has been obtained.

It will be particularly noted that as the operator or drawer destroys one sheet of plans or outlines, he is bringing, at the same time, and constructing a final plan or outline which has been found to be particularly valuable from an educational point of view.

Many other changes could be effected in the particular features of booklet disclosed, and in specific details thereof, without substantially departing from the invention intended to be defined in the claim, the specific description herein merely serving to illustrate certain elements by which, in one embodiment, the spirit of the invention may be effectuated.

What is claimed is:

A booklet having a front tracing sheet of a transparent material and a plurality of removable pages, each containing different elements of a final design to be produced, said final design consisting of a composite of a variety of different unit designs and each of said elements forming part of one of said unit designs and being substantially uniformly distributed over the area of the entire design, said elements being separated and most easily drawn or traced and so disposed upon the page that they may be traced individually with concentration of the attention of the tracer without regard to the final design and without knowledge of the character of the final design, each of said elements when traced tending to complete said unit designs without said unit designs being completed and completing said final design until said last page has been traced and removed.

CHARLES H. FORBELL.